(12) United States Patent
Jackson et al.

(10) Patent No.: US 7,548,575 B1
(45) Date of Patent: Jun. 16, 2009

(54) SELF-SEEDING AND PHASE-LOCKING OF AN ARRAY OF LASERS

(75) Inventors: Paul E. Jackson, Longwood, FL (US); Gary C. Vanstone, Longwood, FL (US); Edward J. Miesak, Windmere, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 97 days.

(21) Appl. No.: 11/439,862

(22) Filed: May 24, 2006

(51) Int. Cl.
*H05B 7/148* (2006.01)
(52) U.S. Cl. .................. 372/108; 372/109; 372/18; 372/25
(58) Field of Classification Search .............. 372/108, 372/109, 18, 25
See application file for complete search history.

(56) References Cited

U.S. PATENT DOCUMENTS

| 5,048,030 | A | * | 9/1991 | Hiiro ..................... 372/68 |
| 5,446,754 | A | * | 8/1995 | Jewell et al. ........... 372/50.123 |
| 5,513,201 | A | * | 4/1996 | Yamaguchi et al. ........... 372/75 |
| 6,304,330 | B1 | * | 10/2001 | Millerd et al. .............. 356/521 |

OTHER PUBLICATIONS

Bruesselbach, Hans, et al., "Self-organized coherence in Fiber Laser Arrays", *Optics Letters*, vol. 30, No. 11, (Jun. 1, 2005),1339-1341.

* cited by examiner

*Primary Examiner*—Minsun Harvey
*Assistant Examiner*—Kinam Park
(74) *Attorney, Agent, or Firm*—Jeffrey D. Myers; Samantha A. Updegraff; Timothy D. Stanley

(57) ABSTRACT

An apparatus and method for combining a plurality of laser beams to form a single output beam comprising employing a plurality of lasers and optically connecting an image rotator and recoupler to each of the plurality of lasers.

16 Claims, 7 Drawing Sheets

SELF-SEEDING AND PHASE-LOCKING OF AN ARRAY OF LASERS

CROSS-REFERENCE TO RELATED APPLICATIONS

Not Applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods and apparatuses for summing coherent laser beams.

2. Description of Related Art

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

In order to effectively sum coherent laser beams to produce a high power single beam, with their combined power and intensity, in a highly coherent output to maximize spatial brightness, it is necessary that the beams be of the same wavelength, exhibit the same intensity and phase profiles ("mode") and overlap and coexist in a path that is colinear and coincident. Furthermore, there must be a phase relation between the beams. To achieve these conditions it is typically necessary to use a separate and external laser to seed the lasers producing the beams being combined, as shown in FIG. 1. This complex and expensive traditional method has at least the following disadvantages: (1) Combined output beam quality fluctuates with beam splitter vibration jitter; (2) Laser cavity tuning response time is limited by PZT (piezo-electric transducer) response time; and (3) Co-linearity and overlap of output beams is compromised by hardware limitations. The present invention describes a method and apparatus for seeding the lasers without using a separate laser and for combining the beams.

Prior phase-locking of an array of lasers has involved either using an external laser to seed the lasers producing the beams being combined, or a method of measuring the quality and/or efficiency of the beam combining and using this information in a feedback servo to adjust the phase of each laser output beam (usually by length tuning the laser cavity mirror separation). A more recent attempted solution has been provided by H. Bruesselbach et al., "Self-organized coherence in fiber laser arrays", OPTICS LETTERS, 30(11), 1339-1341 (Jun. 1, 2005), which employs a one-to-five coupler from Gould Electronics to cause in-phase states to occur. The disadvantages of this approach include: (1) The steady-state, self-organized coherence and laser output mode solution described is complex (possibly involving new applications and advancements of existing theory) and thus it will be difficult to analyze and predict/optimize the performance a particular array of lasers. (2) Unlike the lasers in FIG. 1 in which the lasers to be combined all march in parallel to the beat of the external seed laser and local oscillator "drum" (although the lasers are "trimmed" individually by their heterodyne detector feed back servos), the lasers combined using a self-organized coherence technique, by its very nature involves the in-series rather than in-parallel conforming of phase. "In-series" can often be accompanied by accumulation of undesirables including phase instability which can translate into combined output beam intensity and phase instability. (3) In some cases and particular setups of an array of lasers to be combined, the extraction of the phase information from each and every laser and the communication of this information to each and every laser can burden or "drain" the available combined laser power and reduce the overall combined laser efficiency. (4) In some cases and particular setups of an array of lasers to be combined, the addition of the components required to accomplish the extraction and communication of the phase information from each and every laser can be expensive or impractical.

BRIEF SUMMARY OF THE INVENTION

The present invention is of an apparatus and method for combining a plurality of laser beams to form a single output beam, comprising: employing a plurality of lasers; and optically connecting an image rotator and recoupler to each of the plurality of lasers. In the preferred embodiment, each of the plurality of lasers comprises a laser cavity and a partially reflective mirror optically connected to the image rotator and recoupler. A plurality of turning mirrors combine the outputs of the plurality of lasers into a single output beam. The image rotator and recoupler comprises an image rotator, preferably a Dove prism, a Delta prism, a Pechan prism, or a K-mirror. The image rotator and recoupler preferably additionally comprises one or more of: a corner prism or a first pair of turning mirrors and a second pair of turning mirrors; a combined input from the plurality of lasers and output to the plurality of lasers (most preferably wherein the image rotator and recoupler maps input from each of the plurality of lasers to an output to a different laser of the plurality of lasers); and a polarization phase mask (most preferably a phase retarder array).

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a method and apparatus for combining output from an array of lasers. The individual laser beams to be combined (or more preferably, a low intensity "pick-off" fraction of the beams) are arranged in a circle pattern, each beam lying substantially on the circumference of the circle, substantially evenly spaced, and propagating (pointing) substantially normal to the plane of the circle in substantially the same direction and substantially colinear with the imaginary axis of the circle. An image rotating optical element (a Dove prism, a Delta prism, a Pechan prism, or a K-mirror, for example) is used to rotate the image of the "circle of beams" by a multiple of the angular separation of adjacent beams and then a series of steering mirrors is used to invert, redirect and superimpose the image from whence it came. In this way each laser beam is sent back, not on itself into the output mirror of the laser it came from, but into one of its neighboring lasers, thus providing a seed input for that laser. In this way, after several rotations, the phase information from each and all lasers is communicated to each and all lasers, providing a common mode and suitable constituents for coherent beam combination. The invention introduces a phase relation between the lasers suitable for beam combination and conditions for linear summation of laser beam power into a single beam and for quadratic summation of laser beam intensity for high spatial brightness.

The present invention is a substantial improvement over the prior art. For example, the method and apparatus for self-seeding and phase-locking the array of lasers is generic, and provided that the wavelength band of operation of the optical component incorporates that of the lasers to be combined, the image rotating element, the image inverter, and the steering mirrors (collectively, the "phase locker") can be a stand-alone and self-contained unit. Furthermore, with the addition of phase modifiers (adaptive optics, for example) in the paths of the seed input beams to each laser, the resultant combined laser beam can be modified in intensity and phase using a feed-back or feed-forward method to compensate for de-phasing of the beams after passing through the atmosphere on the way to the intended target in the far field, and to actively compensate for laser pointing stability jitter.

Figure 1:
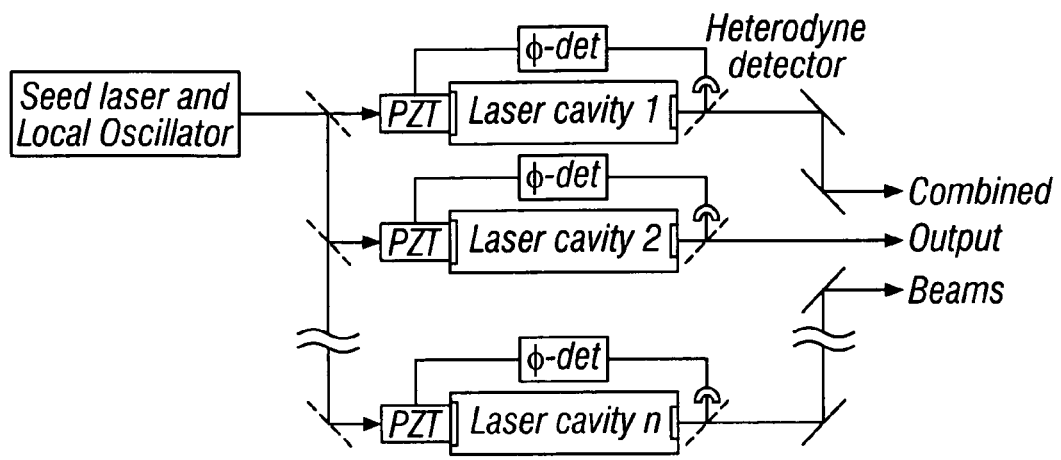
FIG. 1 is a schematic diagram of the typical manner provided in the prior art to combine an array of laser beams.
Figure 2:
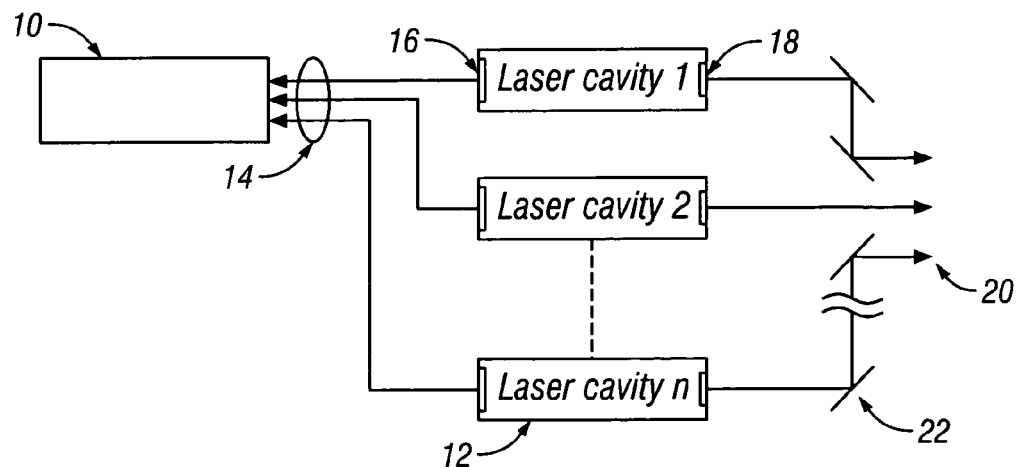
FIG. 2 is a schematic diagram of the apparatus of the invention in use with an array of lasers.
Figure 3:
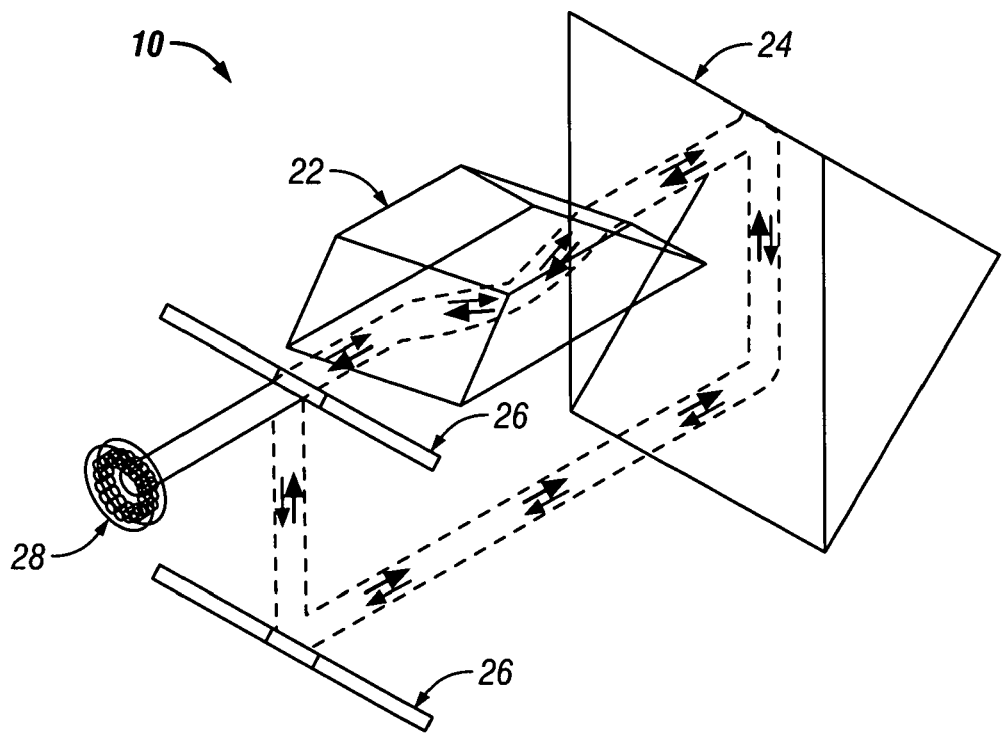
FIG. 3 is a perspective view of a preferred embodiment of the phase locker of the invention.
Figure 4A:
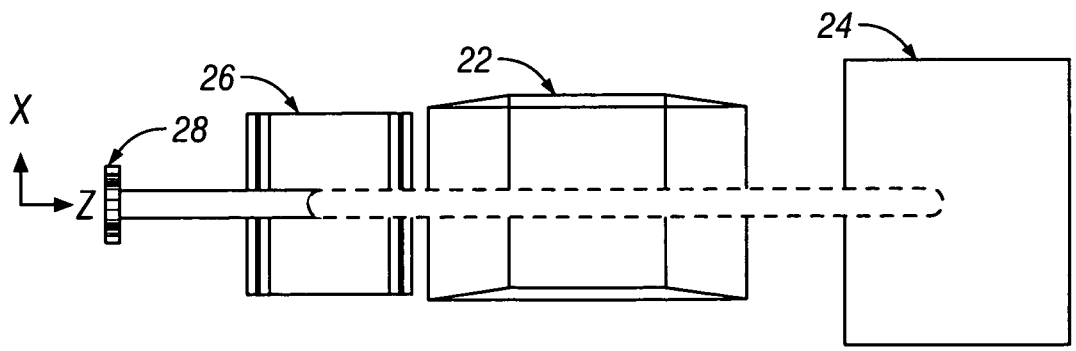
FIGS. 4(a)-(c) are isometric views of the embodiment of FIG. 3.
Figure 4B:
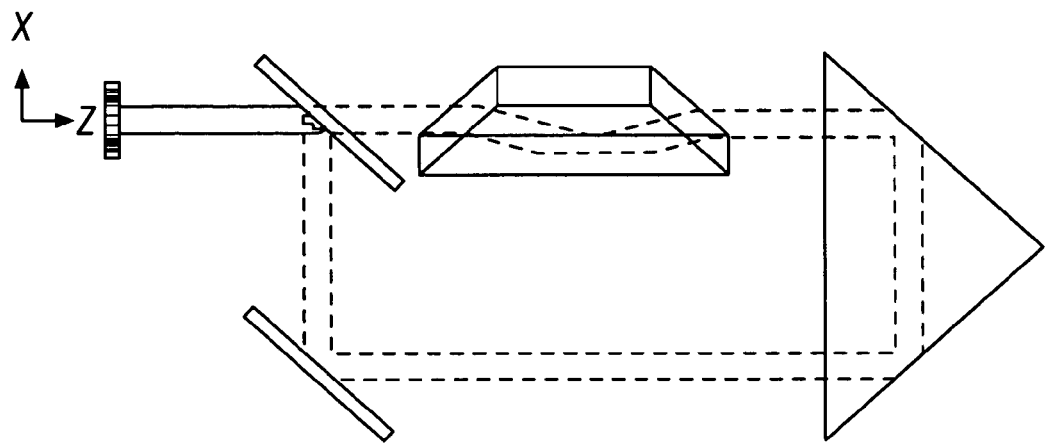
Figure 4C:
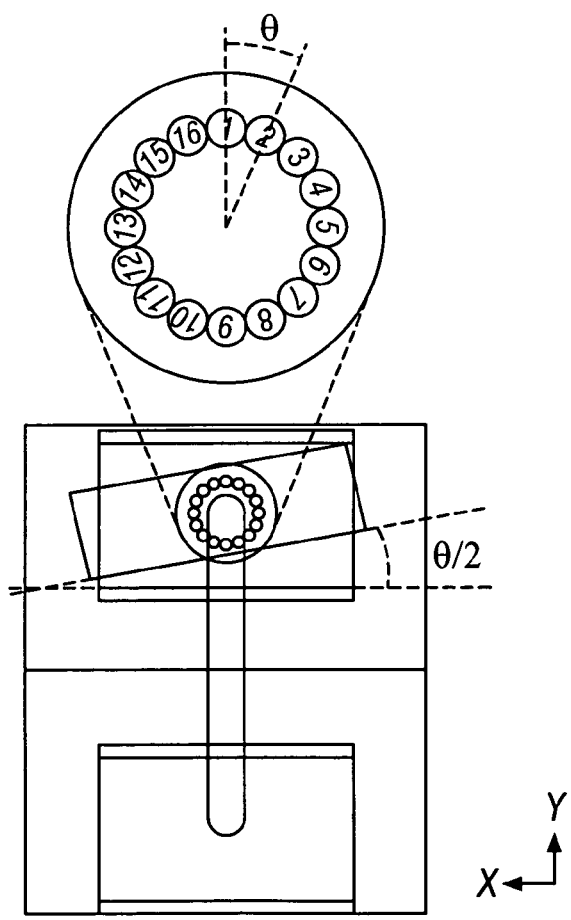
Figure 5A:
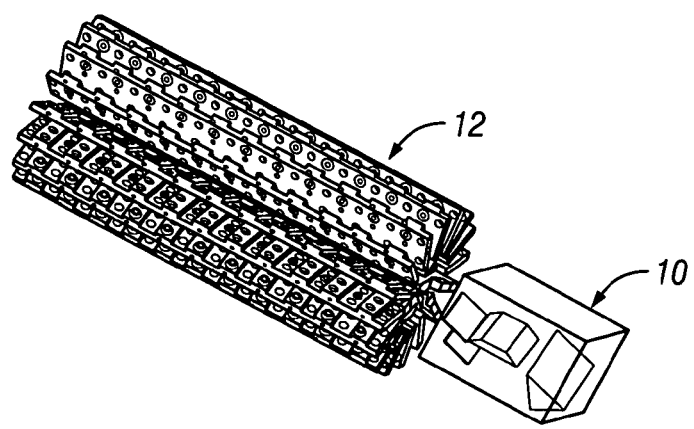
FIGS. 5(a) and 5(b) illustrate that the apparatus of the invention can either be directly coupled to the laser array or connected by a fiber optic bundle.
Figure 5B:
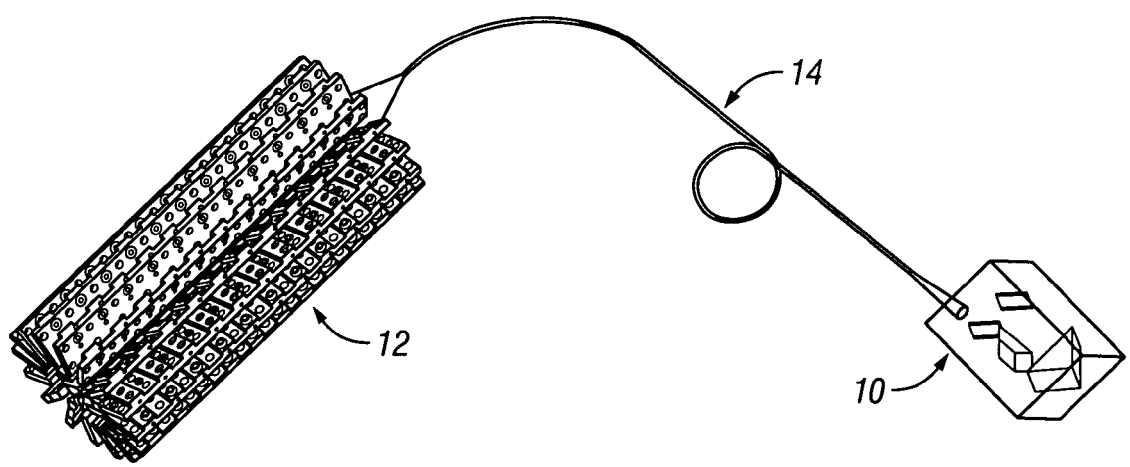
Figure 6:
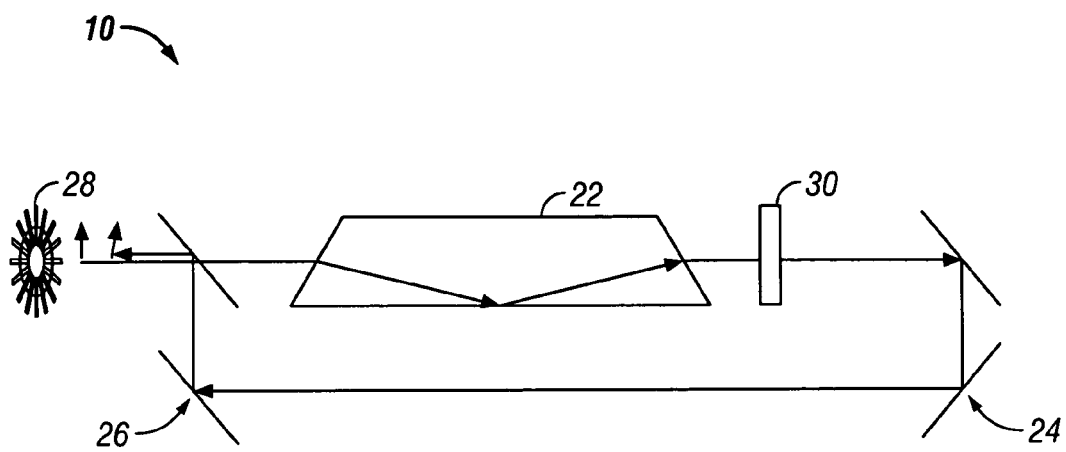
FIG. 6 is a schematic diagram of use of a phase retarder array in the phase locker of the invention.

FIG. 2 illustrates the apparatus 10 of the invention, an image rotator and recoupler, used in conjunction with an array of lasers (with laser cavities) 12. Interactions with the laser array can occur through fiber optic bundle 14, as further illustrated in FIG. 5(b), or through direct connection as in FIG. 5(a). Each laser preferably comprises a partial reflectivity rear mirror and fiber coupler 16 and a front mirror output coupler 18. Turning mirrors 22 operate to combine the laser beams into combined output beam 20.

The advantages of this arrangement include: (1) Simplified and less expensive method with no laser cavity tuning servos required; (2) Combined output beam quality insensitive to vibration jitter; (3) Phase information passed from "each and every to all" laser cavities in a common mode; (4) Low power fraction coupled into each cavity fiber "seeds" the next cavity in the sequence; (5) Phase-Locker, fiber plus cavity analogous to coupled-cavity ring laser; (6) Fibers act as laser cavity transverse mode discriminators to select highest quality output beams; and (7) the Phase locker can be compact and generic (within I band pass of materials and coatings).

FIGS. 3 and 4(a)-4(c) illustrate the phase locker 10 of the invention, comprising image rotator 22 (preferably a Dove prism, a Delta prism, a Pechan prism, or a K-mirror), corner prism 24 (or pair of turning mirrors), turning mirrors 26, and laser array image input and rotated image output 28. Different rotation devices (e.g., a Dove prism and a Pechan prism) exhibit different types of return polarization, which can be configured as desired for best effect. In certain applications, it may be preferably to include polarization phase mask 30 (e.g., a phase retarder array) in the phase locker in order to decouple the rotation device from the return path.

Polarization magnitude and orientation are important to coupling beams back into the resonator. The polarization vector entering the Phase Locker is preferably radially linear polarized. The Phase Locker, with its optical rotator and other optics, preferably produces elliptically polarized light which varies in eccentricity from approximately 0.75 to 0.9. The beam entering the Phase Locker is preferably split off into two beams by a beam splitter. The beam that is transmitted through beam splitter is preferably returned with counterclockwise elliptical polarized light which is coupled into the beamlet to the right of originating beamlet. The beam reflected by the beam splitter is preferably returned with clockwise polarization and coupled into the beamlet to the left of the originating beamlet.

The amount of polarization eccentricity of beams being returned by the phase locker is a function of the orientation of the emitting beamlets to the optical rotator. In order to optimize the coupling efficiency, a polarization phase mask or other polarization control optics (e.g., a phase retarder) are preferably inserted into the Phase Locker that covert the elliptically polarized light to near radially polarized light into the adjacent beamlets for optimum coupling efficiency.

Figure 7:
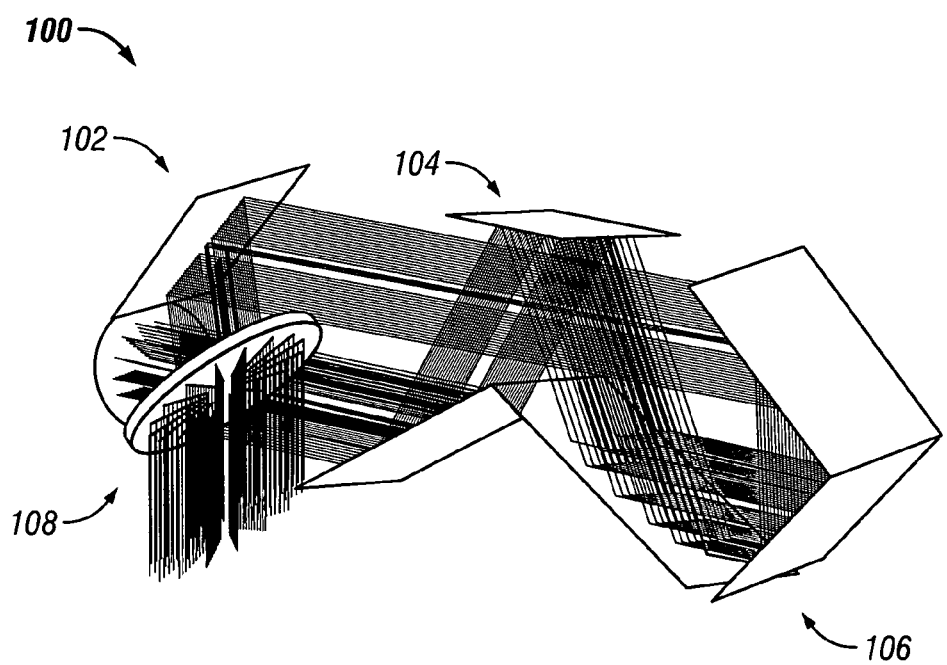
FIG. 7 is a perspective view of another preferred embodiment of the phase locker of the invention.
Figure 8A:
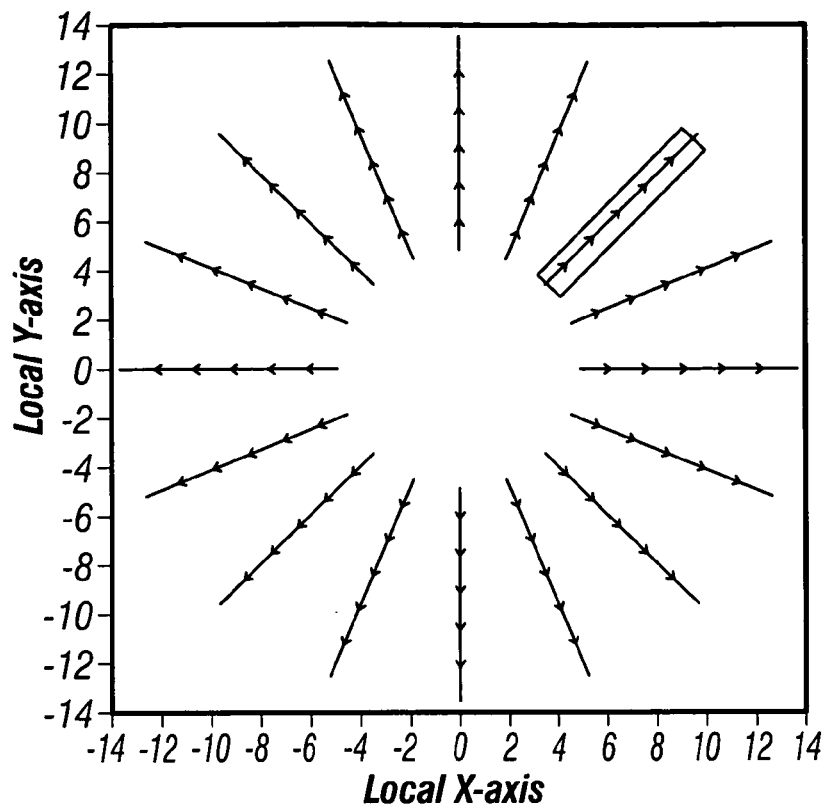
FIGS. 8(a) and 8(b) illustrate the elliptically polarized return from a device according to the invention employing a Dove prism.
Figure 8B:
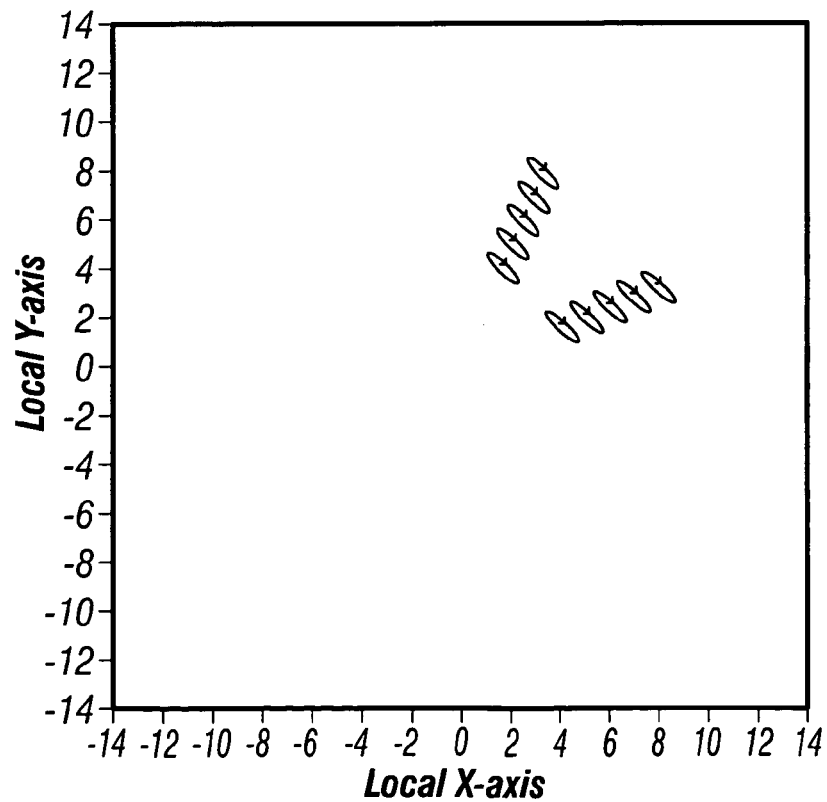

In order to preserve radial linear polarization, an all reflective self-seeding phaselocker embodiment 100 is shown in FIG. 7, which deploys a K-mirror 106 for image rotation, in conjunction with beam splitter 108, fold mirror 102, and roof mirror 104. Embodiments of the invention that employ a rotation prism, such as the Dove Prism, Delta Prism, or Pechan Prism, induce elliptical polarization into the return beam (see FIGS. 8(a) and 8(b)). The elliptical polarized return beam that occurs with a glass prism is the result of the polarization vector changing form at the glass interface of the rotation optics.

Figure 9A:
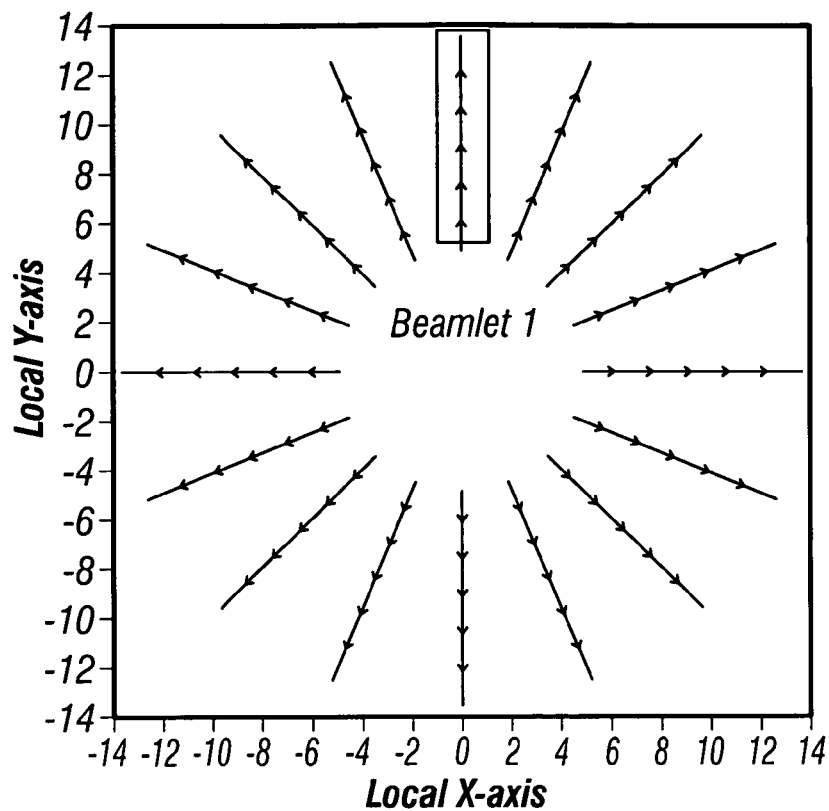
FIGS. 9(a) and 9(b) illustrate the radially polarized return from the embodiment of FIG. 7.
Figure 9B:
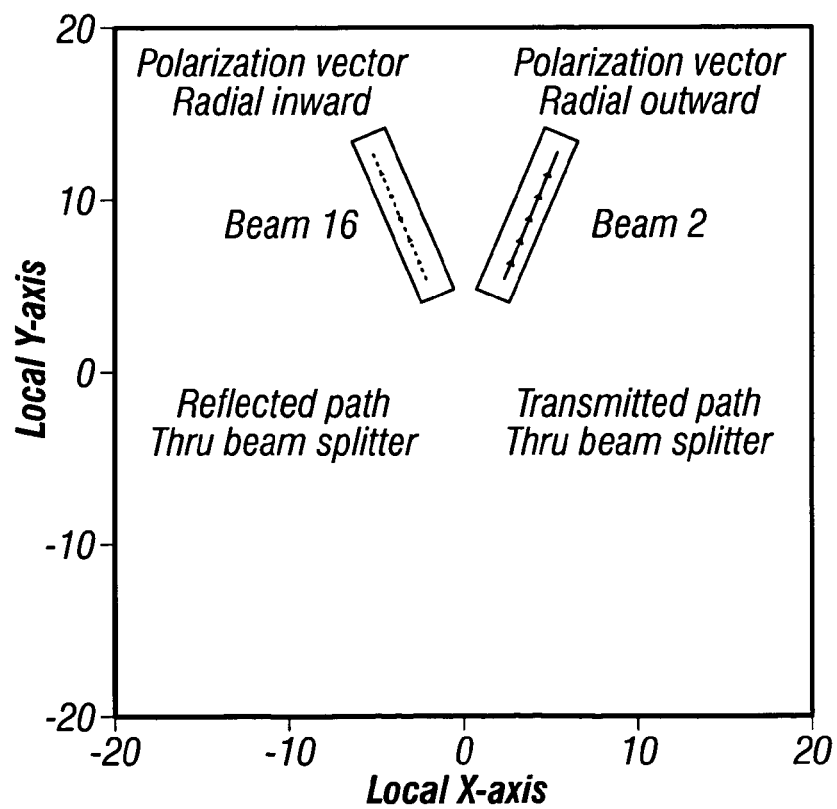

The K-mirror embodiment of the invention, being an all reflective design, has two distinct advantages. The fist is that it is independent of wavelength. Phase Lockers that use rotating prisms preferably have the prism tailored designed for a particular wavelength. The second advantage that a K-mirror rotator has over a glass prism is that it has no glass interfaces that change the form of the linear polarization vector. The return beam of the K-mirror Phase Locker returns a beam that is linear polarized, as shown in FIGS. 9(*a*) and 9(*b*).

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An apparatus for phase locking a plurality of laser beams to form a plurality of phase-locked beams, said apparatus comprising:
    a plurality of lasers; and
    an image rotator and recoupler optically connected to each of the plurality of lasers, said image rotator and recoupler comprising an image rotator and a colinear input from said plurality of lasers and output to said plurality of lasers and wherein said plurality of lasers are phase-locked via self-seeding one of said plurality of lasers with another of said plurality of lasers.

2. The apparatus of claim 1 wherein each of said plurality of lasers comprises a laser cavity and a partially reflective mirror optically connected to said image rotator and recoupler.

3. The apparatus of claim 1 additionally comprising a plurality of turning mirrors combining the outputs of the plurality of lasers into a single output beam.

4. The apparatus of claim 1 wherein said image rotator and recoupler comprises an image rotator selected from the group consisting of a Dove prism, a Delta prism, a Pechan prism, and a K-mirror.

5. The apparatus of claim 1 wherein said image rotator and recoupler additionally comprises a corner prism or a first pair of turning mirrors and a second pair of turning mirrors.

6. The apparatus of claim 1 wherein said image rotator and recoupler maps input from each of said plurality of lasers to an output to a different laser of said plurality of lasers.

7. The apparatus of claim 1 wherein said image rotator and recoupler additionally comprises a polarization phase mask.

8. The apparatus of claim 7 wherein said polarization phase mask comprises a phase retarder array.

9. A method for combining phase locking a plurality of laser beams to form a plurality of phase-locked beams, the method comprising the steps of:
    employing a plurality of lasers;
    optically connecting an image rotator and recoupler to each of the plurality of lasers, wherein the image rotator and recoupler comprise an image rotator and comprise a collinear input from the plurality of lasers and output to the plurality of lasers;
    self-seeding one of the plurality of lasers with another of the plurality of lasers; and
    phase-locking the plurality of lasers.

10. The method of claim 9 wherein each of the plurality of lasers comprises a laser cavity and a partially reflective mirror optically connected to the image rotator and recoupler.

11. The method of claim 9 additionally comprising combining the outputs of the plurality of lasers into a single output beam via a plurality of turning mirrors.

12. The method of claim 9 wherein the image rotator and recoupler comprises an image rotator selected from the group consisting of a Dove prism, a Delta prism, a Pechan comprises an image rotator selected from the group consisting of a Dove prism, a Delta prism, a Pechan prism, and a K-mirror.

13. The method of claim 9 wherein the image rotator and recoupler additionally comprises a corner prism or a first pair of turning mirrors and a second pair of turning mirrors.

14. The method of claim 9 wherein the image rotator and recoupler maps input from each of the plurality of lasers to an output to a different laser of the plurality of lasers.

15. The method of claim 9 wherein the image rotator and recoupler additionally comprises a polarization phase mask.

16. The method of claim 15 wherein the polarization phase mask comprises a phase retarder array.

\* \* \* \* \*